March 31, 1942. L. M. ZIEGLER 2,278,342
EXPOSURE REGISTER
Filed June 4, 1940
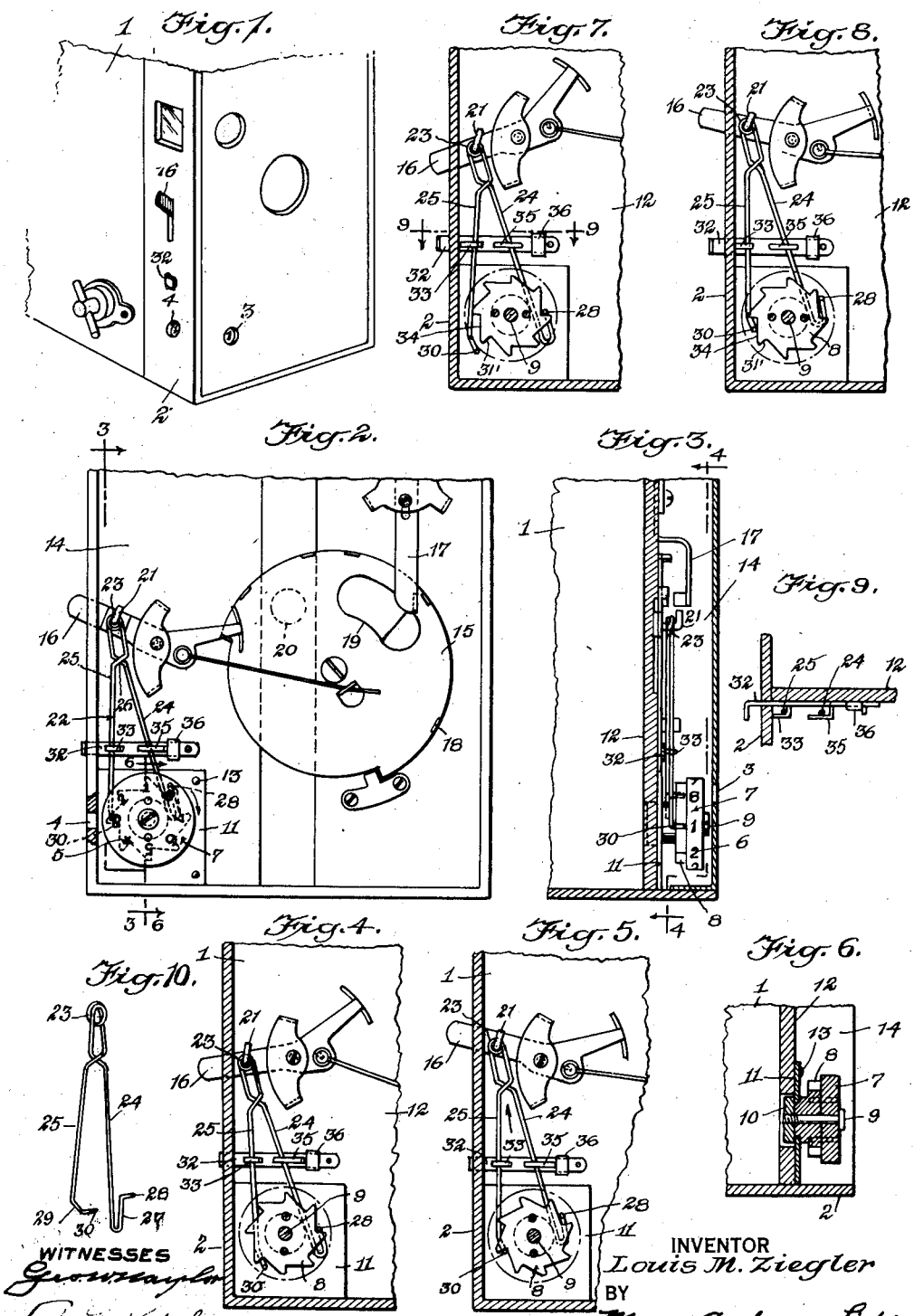
INVENTOR
Louis M. Ziegler
BY
ATTORNEYS Patented Mar. 31, 1942

2,278,342

UNITED STATES PATENT OFFICE 2,278,342

EXPOSURE REGISTER

Louis M. Ziegler, Whitestone, N. Y.

Application June 4, 1940, Serial No. 338,678

2 Claims. (Cl. 235—91)

This invention relates to cameras and particularly to an attachment for cameras designed to indicate the number of times there have been exposures so that double exposures of the film will be eliminated.

An object of the invention is to provide an improved indicating device which may be mounted on cameras now in use and caused to function automatically as the shutter actuating or release mechanism is operated.

Another object of the invention is to provide a film indicator or exposure indicator adapted particularly for use with box cameras and formed to be actuated by the shutter release lever.

A further object of the invention is to provide an indicator which may be operated upon each actuation of the shutter release lever or actuated once for two operations of the release lever in order to take care of a time exposure.

In the drawing:

Fig. 1 is a perspective view of a portion of the front of a well-known type of camera but slightly changed to accommodate a device embodying the invention;

Fig. 2 shows the front face of the camera removed and illustrating an embodiment of the invention shown in operative position, the parts being somewhat enlarged;

Fig. 3 is a sectional view through Fig. 2 approximately on the line 3—3;

Fig. 4 is a sectional view through Fig. 3 approximately on the line 4—4;

Fig. 5 is a view similar to Fig. 4 but showing the lever in its raised position and the other parts correspondingly adjusted;

Fig. 6 is a fragmentary sectional view through Fig. 2 on the line 6—6;

Fig. 7 is a view similar to Fig. 4 but showing the parts adjusted for taking a time exposure;

Fig. 8 is a view similar to Fig. 7 but showing the parts moved for closing the shutter for a time exposure;

Fig. 9 is a fragmentary sectional view through Fig. 7 on the line 9—9;

Fig. 10 is a detail perspective view of a pair of pronged members embodying certain features of the invention.

In the accompanying drawing, 1 indicates a camera of any desired kind, that shown in the accompanying drawing being a well-known box camera. This camera has a casing 2 which, in addition to being provided with the usual openings, is provided with extra openings 3 and 4 for exposing the numbers or legends 5 and 6 arranged on the outer flat face and the periphery respectively of the numbered wheel or rotor 7. The wheel 7 has a toothed member or ratchet wheel 8 rigidly secured thereto or formed integral therewith and held in place by a suitable pivot pin 9. As shown in Fig. 6, this pin coacts with a nut 10 so as to clamp the supporting plate 11 connected with the front wall 12 of the camera by any suitable means, as for instance, nails or pins 13. While this form of attachment is desirable for old cameras, it will be readily understood that the pin 9 could be screwed into the wall 12 or mounted in place in some other way.

As shown in Fig. 2, a numbered wheel 7 is arranged at the lower left-hand corner of the front chamber 14 of the camera as this place is normally unused. The camera, as disclosed, is provided with an oscillating or rocking shutter 15, a release or actuating lever 16 and a sliding bar 17 which functions to stop the movement of the shutter 15 when the same is open so as to secure a time exposure. For instance, when the parts are in the position shown in Fig. 2 and lever 16 is swung downwardly, the abutment 18 will strike the lower end of the bar 17 and stop the movement of the shutter 15 when the opening 19 therein has exposed the lens opening 20. The parts are arranged in this position until bar 17 is pulled upwardly or until lever 16 is swung back to its upper position.

It will be understood that all the parts from 15 to 20 are old and well known and form part of the camera 1. A pin 21 is secured to the lever 16 in any desired manner and on this pin the pronged pawls 22 are mounted. These pronged pawls are formed of resilient wire or resilient material of any desired kind. As shown in the accompanying drawing, there is provided a turn of the wire presenting a spring eye 23 loosely fitting over pin 21. From the eye 23 arms 24 and 25 extend. These arms cross at point 26 so that arm 25 extends on the left side of the tooth wheel 8 and arm 24 extends on the right side. Arm 24 is provided with a looped hook-shaped portion 27 which merges into a laterally extending pin 28. Arm 25 is provided with an inclined portion 29 having an upstanding pin 30. The pins 28 and 30 engage the respective teeth of the tooth wheel 8, as shown particularly in Fig. 4.

When the parts are working in a normal way the downward movement of the lever 16 will cause the pin 28 to rotate the toothed wheel 8 a certain distance, namely, the distance between one legend 5 to the next adjacent legend. When the lever 16 is moved upwardly to the position shown in Fig. 2, pin 30 will rotate the toothed wheel one-eighth of a revolution. It will be understood that the toothed wheel in both instances is rotated clockwise. As long as snap shots are to be made, each downward movement and each upward movement of the lever 16 will provide a desired movement of the wheel 7. In the accompanying drawing eight numbers have been provided on wheel 7 and a similar number of teeth 31. This is intended to accommodate a film having eight exposure spaces. Where the film has more or less exposure spaces, the wheel 7 and the tooth member 8 must be changed to agree with the film.

In case it is desired to take a time exposure and the lever 16 is in the position shown in Fig. 2, the slide member or bar 17 will be moved downwardly as illustrated in Fig. 2. Lever 16 is then swung downwardly to provide an exposure and the shutter 15 will stop its movement when the abutment 18 strikes member 17. While this is taking place pin 28 will have rotated the wheel 7 the distance of one number or legend for indicating an exposure. The slide member 32 is then pulled outwardly to the position shown in Figs. 7 and lever 16 moved upwardly from the position shown in Fig. 7 to that shown in Fig. 2. This will return the shutter to the position shown in Fig. 2 but the wheel 7 will not rotate. It will be understood that before any time exposure is made, member 17 is pushed downwardly to the position shown in Fig. 2 and the slide member 32 is moved outwardly to the position shown in Fig. 7. The downward movement of lever 16 will provide an exposure and the rotation of the wheel 7 one number. The upward movement will close the shutter but the wheel 7 will not be rotated.

As illustrated in Fig. 7, the hook member 33 carried by the slide mamber 32 will move the prong member 25 so that the pin 30 will not engage the tooth 31' as illustrated in Fig. 8, but will move along the surface 34 and engage the radial portion of the next tooth above the tooth 31', so as to prevent the return movement of the pin 28 and associated parts from moving the wheel in a reverse direction. The slide member 32 is provided with a guiding hook 35 which merely holds the member 24 in proper functioning position.

A guiding strap 36 is connected with the front wall 12 and assists in guiding the slide member 32, which slide member extends through the wall 2, whereby it may be engaged readily by the operator. The hook member 33 is of such length that it will strike the inner surface of wall 2 and limit the sliding action of slide member 32, so that when pulled out completely, or as far as it will go, the pins 28 and 30 and associated parts will be in their correct position. When snap shots are desired, the slide member 32 is moved inwardly to the position shown in Fig. 2 and then there will be a new exposure and new movement of wheel 7 for each swinging movement of lever 16.

I claim:

1. In a device for indicating the number of exposures made on a photographic film, a numeral wheel, a shutter operated pivoted actuator having resilient pawls, ratchet teeth on said wheel with which said pawls coact to rotate said wheel step by step in one direction upon the up and down movement of said actuator, and means which may be manually set to act on one of said pawls to flex it a certain degree so that it will be unable to coact with said teeth and therefore unable to move said wheel, but which causes said pawl to engage one of said teeth to prevent retrograde movement of said wheel.

2. In a device for indicating the number of exposures made on a photographic film, a numeral wheel, a shutter operated pivoted actuator having resilient pawls, ratchet teeth on said wheel with which said pawls coact to rotate said wheel step by step in one direction upon the up and down movement of said actuator, a slide having means which when the slide is set in one position acts on one of said pawls to flex it a certain degree so that it will be unable to coact with said teeth and therefore unable to move said wheel, but which causes said pawl to engage one of said teeth to prevent retrograde movement of said wheel.

LOUIS M. ZIEGLER.